(12) United States Patent
Zaetterqvist

(10) Patent No.: US 10,683,090 B2
(45) Date of Patent: \*Jun. 16, 2020

(54) DYNAMICALLY WITH TILTABLE MAGAZINE AND METHOD FOR LAUNCHING COUNTERMEASURES

(71) Applicant: SAAB AB, Linkoeping (SE)

(72) Inventor: Christer Zaetterqvist, Uppsala (SE)

(73) Assignee: SAAB AB, Linkoeping (SE)

( \* ) Notice: Subject to any disclaimer, the term of this patent is extended or adjusted under 35 U.S.C. 154(b) by 0 days.

This patent is subject to a terminal disclaimer.

(21) Appl. No.: 16/301,572

(22) PCT Filed: May 5, 2017

(86) PCT No.: PCT/SE2017/050437
§ 371 (c)(1),
(2) Date: Nov. 14, 2018

(87) PCT Pub. No.: WO2017/200455
PCT Pub. Date: Nov. 23, 2017

(65) Prior Publication Data
US 2019/0092469 A1    Mar. 28, 2019

(30) Foreign Application Priority Data
May 17, 2016 (SE) ...................... 1650665

(51) Int. Cl.
*F41A 27/00* (2006.01)
*B64D 1/02* (2006.01)
(Continued)

(52) U.S. Cl.
CPC .................. *B64D 1/02* (2013.01); *B64D 7/00* (2013.01); *F41A 17/08* (2013.01); *F41A 27/08* (2013.01);
(Continued)

(58) Field of Classification Search
CPC . F42B 5/15; F42B 12/70; F41H 11/02; B64D 1/02; B64D 7/00; F41A 27/08
(Continued)

(56) References Cited

U.S. PATENT DOCUMENTS 2,391,956 A    1/1946 Eastman
2,467,514 A    4/1949 Woodman
(Continued)

FOREIGN PATENT DOCUMENTS

DE    3902624 A1    8/1990
EP    0253028 B1    8/1990
(Continued)

OTHER PUBLICATIONS

International Searching Authority, International Search Report and Written Opinion for International Application No. PCT/SE2017/050436, dated Jul. 21, 2017, 12 pages, Swedish Patent and Registration Office, Sweden.
(Continued)

*Primary Examiner* — Michael D David
(74) *Attorney, Agent, or Firm* — Alston & Bird LLP

(57) ABSTRACT

A dispenser for storing and launching countermeasures from an aircraft, comprising an elongate body provided with at least one launch opening where the countermeasures are stored in cartridges, where the cartridges are interconnect to each other in a slidable manner, and where the cartridges are adapted to be tilted by a tilting means to a selected angle, such that the openings of the cartridges can be directed in a selected direction. The advantage of the invention is that a countermeasure can be directed in a desired angle before it is launched.

14 Claims, 4 Drawing Sheets

(51) Int. Cl.
*F41H 11/02* (2006.01)
*F42B 5/15* (2006.01)
*F41F 7/00* (2006.01)
*F41F 1/08* (2006.01)
*F42B 12/70* (2006.01)
*F41A 17/08* (2006.01)
*F41A 27/08* (2006.01)
*B64D 7/00* (2006.01)

(52) U.S. Cl.
CPC ............... *F41F 1/085* (2013.01); *F41F 7/00* (2013.01); *F41H 11/02* (2013.01); *F42B 5/15* (2013.01); *F42B 12/70* (2013.01); *F41F 1/08* (2013.01)

(58) Field of Classification Search
USPC ........... 89/37.16–37.22, 37.01, 37.02, 41.14; 102/505
See application file for complete search history.

(56) References Cited

U.S. PATENT DOCUMENTS

| | | | |
|---|---|---|---|
| 3,808,595 | A | 4/1974 | Coop et al. |
| 3,934,846 | A | 1/1976 | Maurer |
| 4,280,394 | A | 7/1981 | Singenberger et al. |
| 4,674,393 | A | 6/1987 | Schaulin et al. |
| 5,198,609 | A | 3/1993 | Gillman |
| 5,340,054 | A | 8/1994 | Smith et al. |
| 5,699,981 | A | 12/1997 | McGrath et al. |
| 6,098,925 | A | 8/2000 | Burdsall, II et al. |
| 6,231,002 | B1 | 5/2001 | Hibma et al. |
| 7,640,858 | B1 | 1/2010 | Herbage et al. |
| 10,495,424 | B2 * | 12/2019 | Zaetterqvist ............ F42B 12/64 |
| 2001/0015126 | A1 | 8/2001 | Grunewald |
| 2003/0117309 | A1 | 6/2003 | Pappert et al. |
| 2004/0104309 | A1 | 6/2004 | Segota et al. |
| 2005/0204910 | A1 | 9/2005 | Padan |
| 2010/0294119 | A1 | 11/2010 | Buechler et al. |
| 2010/0326262 | A1 | 12/2010 | Galanti et al. |
| 2011/0155856 | A1 | 6/2011 | Zachrisson |
| 2012/0125183 | A1 | 5/2012 | Zätterqvist |
| 2012/0210855 | A1 | 8/2012 | Clark et al. |
| 2016/0121996 | A1 | 5/2016 | Eveker et al. |
| 2019/0092469 | A1 | 3/2019 | Zaetterqvist |
| 2019/0137220 | A1 * | 5/2019 | Zaetterqvist ............ F41F 1/08 |
| 2019/0178613 | A1 * | 6/2019 | Zaetterqvist ............ B64D 7/00 |

FOREIGN PATENT DOCUMENTS

| | | | |
|---|---|---|---|
| EP | 1247735 | A3 | 1/2004 |
| EP | 1194331 | B1 | 5/2004 |
| EP | 2157398 | A2 | 2/2010 |
| EP | 2279119 | B1 | 12/2015 |
| EP | 2421754 | B1 | 10/2016 |
| GB | 2410542 | A | 8/2005 |
| GB | 2505721 | A1 | 3/2014 |
| WO | WO 2010/123422 | A1 | 10/2010 |
| WO | WO-2014/140587 | A1 | 9/2014 |
| WO | WO-2015/072901 | A1 | 5/2015 |

OTHER PUBLICATIONS

International Searching Authority, International Search Report and Written Opinion for International Application No. PCT/SE2017/050440, dated Jul. 21, 2017, 12 pages, Swedish Patent and Registration Office.

International Searching Authority, International Search Report and Written Opinion for International Application No. PCT/SE2017/050437, dated Jul. 21, 2017, 12 pages, Swedish Patent and Registration Office.

International Searching Authority, International Search Report and Written Opinion for International Application No. PCT/SE2017/050441, dated Jul. 21, 2017, 13 pages, Swedish Patent and Registration Office.

International Searching Authority, International Search Report and Written Opinion for International Application No. PCT/SE2017/050442, dated Aug. 4, 2017, 14 pages, Swedish Patent and Registration Office.

Extended European Search Report for European Patent Application No. 17799760.8, dated Nov. 18, 2019, (8 pages), European Patent Office, Munich, Germany.

Extended European Search Report for European Patent Application No. 17799758.2, dated Nov. 21, 2019, (6 pages), European Patent Office, Munich, Germany.

Extended European Search Report for European Patent Application No. 17799759.0, dated Nov. 21, 2019, (7 pages), European Patent Office, Munich, Germany.

Extended European Search Report for European Patent Application No. 17799763.2, dated Nov. 21, 2019, (7 pages), European Patent Office, Munich, Germany.

Extended European Search Report for European Patent Application No. 17799764.0, dated Nov. 26, 2019, (8 pages), European Patent Office, Munich, Germany.

International Searching Authority, International Search Report and Written Opinion for International Application No. PCT/SE2017/050438, dated Jul. 27, 2017, (12 pages), Swedish Patent and Registration Office, Sweden.

* cited by examiner

DYNAMICALLY WITH TILTABLE MAGAZINE AND METHOD FOR LAUNCHING COUNTERMEASURES

CROSS REFERENCE TO RELATED APPLICATIONS

This application is a National Stage Application, filed under 35 U.S.C. § 371, of International Application No. PCT/SE2017/050437, filed May 5, 2017, which claims priority to Swedish Application No. 1650665-1, filed May 17, 2016; the contents of all of which are hereby incorporated by reference in their entireties.

BACKGROUND

Related Field

The present invention relates to a dispenser for storing and launching countermeasures, such as flares and chaff, where the countermeasures are stored in a tiltable magazine.

DESCRIPTION OF RELATED ART

Arrangements for storing and launching payloads, such as countermeasures, which are designed to be mounted on aircrafts, are previously known. Such arrangements comprise an elongate body provided with at least one launch opening. The shape of the arrangement may have other equivalent shapes, such as an elliptic or circular shape. However, an elongate body is an efficient shape. Such arrangements are mounted with the longitudinal direction of the elongate body essentially coinciding with the flight direction of the aircraft. The countermeasures are connected to a firing control unit for feeding firing signals to the countermeasures. The countermeasures can consist of passive means, such as chaff foil, but can also consist of for example IR flares, or other active measures. The countermeasures are stored in a magazine in the arrangement, comprising a plurality of cartridges, with one countermeasure in each cartridge.

One problem with known arrangements is that unfavourable acoustic phenomenon, such as extremely high air induced noise and vibration levels, are generated due to the open cavities of the cartridges holding the countermeasures, after firing of the countermeasures. The relative wind speed, due to the speed of the aircraft, interacts with the opening of an empty cartridge in which a countermeasure has been stored. The open cavity may act as barrels which oscillate at its natural inherent frequency. This acoustic noise can be localised by human ear and may also cause damage on the equipment, such as electric components, due to the strong vibrations created. The longitudinal extension and the number of openings of the cartridges in the elongated body can be rather large. The angle of a cartridge relative the travelling direction of the aircraft will also affect the induction of acoustic noise.

It is known to arrange a vortex generating means in front of a launch opening, which is adapted to disturb and distribute the wind flow over the magazine in order to reduce the induced noise by creating a turbulent air flow. However, the effect of such a vortex generating means decreases with the increasing length of the launch opening, since the air flow will be more laminar farther away from the vortex generating means, i.e. the air flow may be relatively laminar at the rear of a longer opening.

Further, such a vortex generating means will generate turbulent flows that are difficult to control and that will result in high energy losses. Such a solution may also contribute to an increased extension of the design of the arrangement in the longitudinal extension of the elongated body.

A further problem with such an arrangement is that the arrangement is sensitive for influence of the air flow depending e.g. on the speed of the aircraft and of the position of the elongated body. This solution will further not reduce the RCS created by the open cavities.

An example of a previously known arrangement described as a dispenser which is used for launching countermeasures and which is provided with several cartridges, is described in document EP 1194331 B1. An elongated body of the dispenser is provided with fixed means, described as a spoiler, in front of each compartment for acting on the air stream and for creating a low dynamic pressure across the compartment openings.

From document EP 0253028 B1, it is known to provide the exterior surface of an aircraft with a pair of vortex generators arranged right in front of an inlet opening in order to increase the mass airflow into the inlet.

A further problem with known dispensers is that the launch angle is fixed to a set angle which is believed to be optimal for the intended use. A fixed launch angle may be a good solution for an aeroplane, which has a known flight direction and a known speed range. For a helicopter, a fixed launch angle is however not optimal, since both flight angle, flight speed and the orientation of the aircraft may vary considerably.

The known solutions will reduce the acoustic noise induced by an open cavity. They will however cause a high energy loss. Even though these arrangements may give an acceptable result in some cases, there is room for improvements.

BRIEF SUMMARY

One object of the present invention is to at least partially eliminate the drawbacks associated with the solutions known in the prior art. Another object is to minimise the occurrence of acoustic phenomenon which are caused by the openings in cavities which have been emptied of payloads, such as countermeasures. Another object is to provide a dispenser in which the launch angle can be selected. Another object of the invention is to provide an aircraft comprising such a dispenser.

The solution to the problem according to the invention is described in the characterizing part of claim 1. Claim 12 refers to an advantageous method for launching a countermeasure. The other claims contain advantageous embodiments and further developments of the dispenser and the method.

In a dispenser for storing and launching countermeasures, comprising an elongate body provided with at least one launch opening adapted for storing the countermeasures in cartridges, where the dispenser comprises a plurality of cartridges forming a magazine, where each cartridge comprises an opening and a centre axis, where the dispenser is adapted to be mounted on an aircraft with the longitudinal direction of the elongate body essentially coinciding with the direction of motion of the aircraft, the object of the invention is achieved in that the cartridges are arranged to each other in a slidable manner in a direction coinciding with the centre axis, and where the cartridges of the magazine are adapted to be tilted by a tilting means in a selected angle with reference to the direction of motion of the aircraft and on the relative azimuth and elevation angle to an incoming threat, such that the openings of the cartridges can be directed in a selected direction.

By this first embodiment of the dispenser according to the invention, a dispenser is provided, in which the cartridges of the countermeasure magazine can be tilted with a selected angle in a desired direction, in which the countermeasure is to be launched. The selected angle depends on the direction of motion of the aircraft and on the relative azimuth and elevation angle to an incoming threat. In this way, it is also possible to tilt the cartridges to a resting position in which there is no acoustic noise induced by one or more open cavities. The resting position may also be a position in which the cartridges are arranged in the centre of the tilting mechanism, or in a predefined direction which is believed to be the "best choice" for a launch of a countermeasure. For an aeroplane, the cartridges are preferably tilted somewhat backwards in order to minimize induced noise and vibrations. For a helicopter, the resting position may e.g. be directed outwards and sideways. A helicopter may e.g. carry more than one and up to four dispensers, e.g. one at each corner, where the cartridges all use different resting positions.

When a countermeasure is to be launched in a selected direction, the cartridges are tilted to an active position, pointing in the desired launching direction. The preferred launch direction for an aeroplane is often forwards and downwards with an angle of 30-60 degrees, which leaves the openings of empty cavities of the magazine angled towards the airflow of the aircraft. It is also possible to direct the cartridges in a sideway direction. In this angle, there is a risk that acoustic noise is induced in the open cavities. When the countermeasure has been launched, the cartridges are tilted back to the resting position. In this way, the induced noise and the induced mechanical vibrations are minimized. A cartridge opening is here perpendicular to the centre axis of the cartridge, but could have another orientation. The preferred launch direction for a helicopter may be in any direction, since a helicopter may stand still or fly in any direction. There are of course limitations for the possible tilting angle, but it is preferred that a cartridge can be tilted both forwards and rearwards by at least 30 degrees, and in one example sideways by at least 30 degrees.

The magazine is operated and tilted by one or more actuators, which are controlled by an electronic control unit. In one example, an input signal to the ECU may be a measured acoustic signal, which detects induced noise in the cavities. Such a signal may be advantageous since it allows an actual feedback of the induced noise signal, which can be used to optimize the resting position of the magazine. The induced noise may depend on several conditions, such as flight speed, altitude, temperature, flight attitude, number of open cavities, etc. By using a feedback system based on a measured acoustic signal, the resting position can be optimized at all times. The input signal may also take account of the actual flight direction of the aircraft, such that the launch angle of a countermeasure can be adapted to the actual elevation and azimuth of the aircraft, especially it the aircraft flies relatively slow.

The cartridges are arranged adjacent each other in a slidably manner, such that the cartridges allows for tilting of the magazine. In this way, the openings of the cartridges can be directed in a selected direction. The cartridges are adapted to be tilted in a forward direction and a backward direction. They may also be adapted to be tilted in a sideway direction. The cartridge comprises in one example longitudinal interconnection means arranged in parallel with the centre axis, where adjacent cartridges are interconnected to each other in a slidable manner. The interconnection means may e.g. comprise longitudinal grooves and tongues interconnecting adjacent cartridges.

A cartridge is advantageously provided with a square cross-section. In this case, the interconnection means preferably extend on a plurality of the longitudinal external sides of the cartridge. A cartridge can also be provided with other cross-sectional shapes, for example a triangular, oval, round or polygonal shape. Depending on the cross-sectional shape, the interconnection means preferably extend on at least one external side of each cartridge such that adjacent cartridges can be interconnected to each other.

The magazine is arranged to be tilted by a tilting means in a selected angle with reference to the direction of motion of the aircraft, such that the openings of the cartridges can be directed in the selected direction. The magazine and thus the cartridges are adapted to be tilted from a resting position to an active position. Here, the directions will be defined as follows. The forward direction of the aircraft is defined as the direction of motion of the aircraft. An aeroplane is flying in the horizontal plane, i.e. the wings of the plane are parallel to the horizontal plane. The horizontal plane comprises a forward horizontal direction, i.e. the direction of motion of the aircraft, and a sideway horizontal direction, i.e. perpendicular to the forward horizontal direction. The vertical direction is defined as being perpendicular to the horizontal plane. For a helicopter, the normal flight direction is defined in the same way.

The resting position is typically a position where the acoustic effect is as small as possible or is not present at all. In this position, the cartridges are directed in a vertical direction or in a direction inclined rearwards by up to 10 degrees, such that the openings are directed slightly rearwards. The orientation of the cartridge openings has an effect on the resting position since the goal is to direct the cartridge openings downstream in the resting position to eliminate the acoustic effect of open barrels.

The active position is a position where the cartridges are directed e.g. between 30-60 degrees forwards or backwards in the vertical direction. In the active position, the cartridges could also be directed sideways with at least 30 degrees in the horizontal direction in order to enable a forward or rearward and sideway launch of a countermeasure.

Hence, the dispenser is adapted to tilt from a resting position to an active position before a countermeasure is fired and to tilt back to the resting position after the countermeasure is fired.

According to one aspect, the tilting means comprises one fixed hinge-point, as rotation point, attached to the elongate body and to one position of the magazine. The hinge-point may be attached to the magazine via one cartridge. The tilting means may e.g. comprise a sliding bar positioned at a distance from the hinge-point. The sliding bar slidably interconnects the cartridges via sliding bar connections attached to at least some of the cartridges which allows for tilting of the magazine by displacement of the sliding bar in a forward or rearward direction. The hinge-point may be positioned at any position of the cartridge, e.g. at a position at the bottom, at a position at the opening or at an intermediate position. The sliding bar is attached to the magazine at a position spaced apart from the hinge-point.

The dispenser may comprise more than one launch opening. There may e.g. be one or more launch openings directed downwards, and one or more launch openings directed sideways. Each launch opening is preferably provided with a tiltable magazine.

The invention also relates to a method for launching a countermeasure from a dispenser mounted on an aircraft. The countermeasure is arranged in a cartridge comprised in a magazine. The method comprises the steps of: tilting the cartridge from a resting position to an active position, launching the countermeasure, and tilting the cartridge back to the resting position.

BRIEF DESCRIPTION OF THE FIGURES

The invention will be described in greater detail in the following, with reference to the embodiments that are shown in the attached drawings, in which FIG. 1 schematically shows a side view of an aircraft provided with a dispenser according to an embodiment of the invention for storing and launching countermeasures, FIG. 2 schematically shows a side view of a dispenser in a resting position according to the invention, FIG. 3 schematically shows a side view of a dispenser in an active position according to the invention, FIG. 4 schematically shows a front view of a part of a dispenser according to the invention, FIG. 5 schematically shows a side view of a magazine in a resting position to be used in a dispenser according to the invention, and FIG. 6 schematically shows a side view of a magazine in an active position to be used dispenser according to the invention in an open state.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, forward, rearward, sideway, etc. refer to directions of an aircraft flying forwards in a normal orientation.

Figure 1:
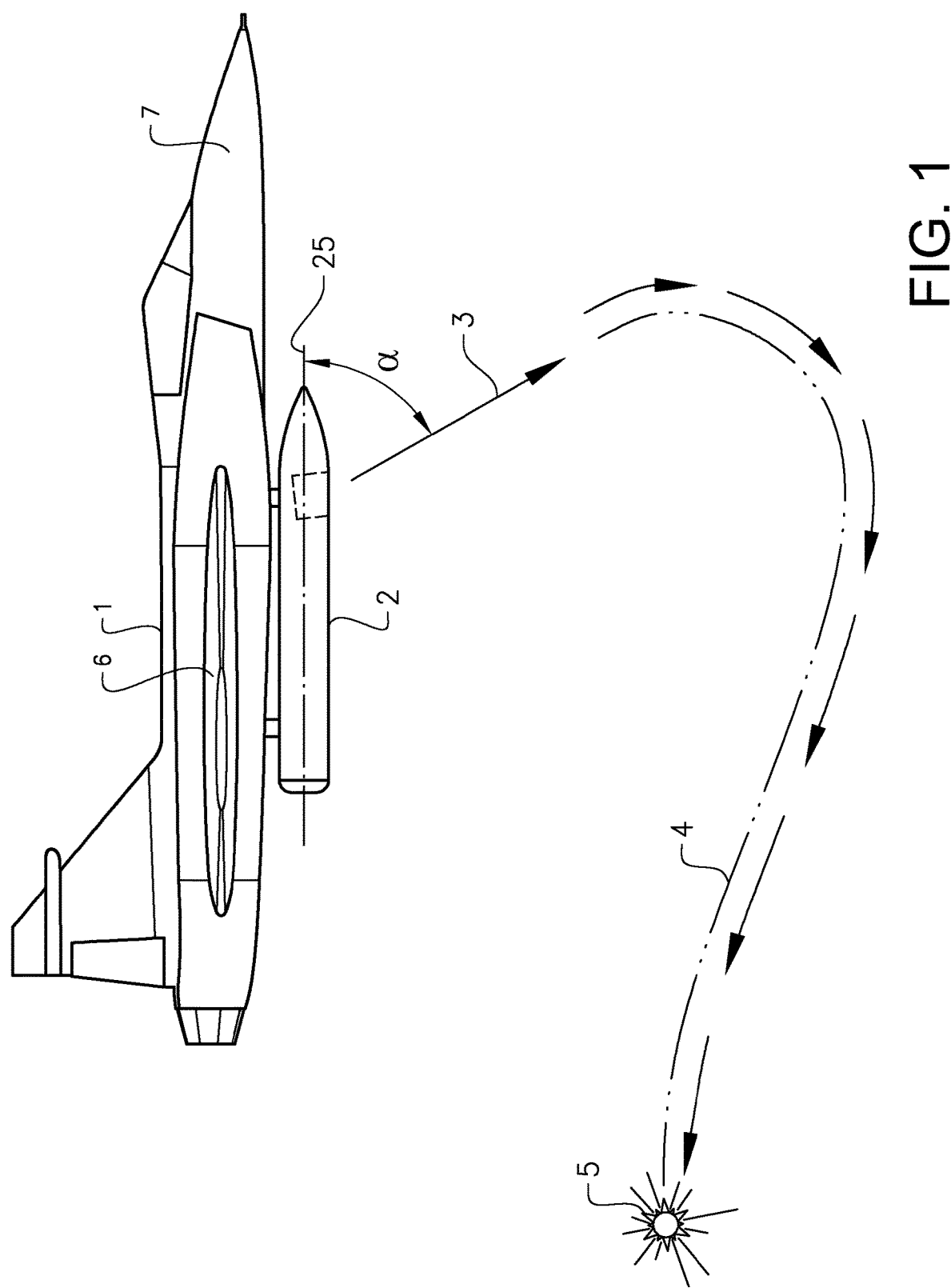

An aircraft 1 shown in FIG. 1 is provided with a dispenser 2 for storing and launching payloads, hereinafter described as countermeasures 5. The dispenser 2 has its longitudinal direction essentially coinciding with the longitudinal direction of the aircraft 1. An arrow 3 designates the direction of launching from the dispenser 2. The character a designates the launch relative to the direction of movement of the aircraft 1 when the countermeasures 5 are launched obliquely forwards and downwards. The trajectory 4 for a launched flare 5 is indicated by a broken line. During the time from when a flare 5 is activated for launch to when it reaches the position shown in FIG. 1, sufficient time has elapsed for the flare 5 to have become a fully active decoy target in close proximity to the aircraft 1. In the example shown in FIG. 1, the dispenser 2 is placed under a wing 6 near its attachment to the main body 7 of the aircraft 1. It is also possible to place the dispenser 2 further out on the wing 6 or directly on the main body 7 of the aircraft 1, e.g. on the exterior of the aircraft 1.

The aircraft may also be a helicopter. Since the helicopter may stand still or may fly upwards, downwards, rearwards, forwards or sideways and with varying speeds, the launch angle will depend on the actual flight direction of the helicopter as well as on the relative azimuth and elevation angle to an incoming threat.

Figure 2:
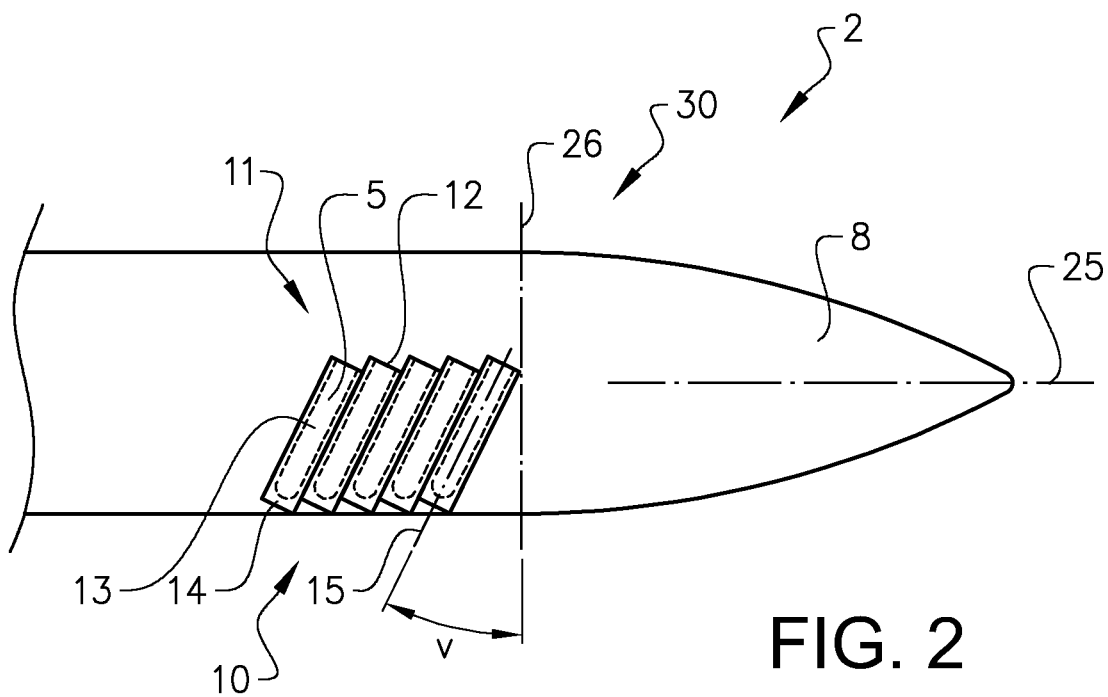
Figure 3:
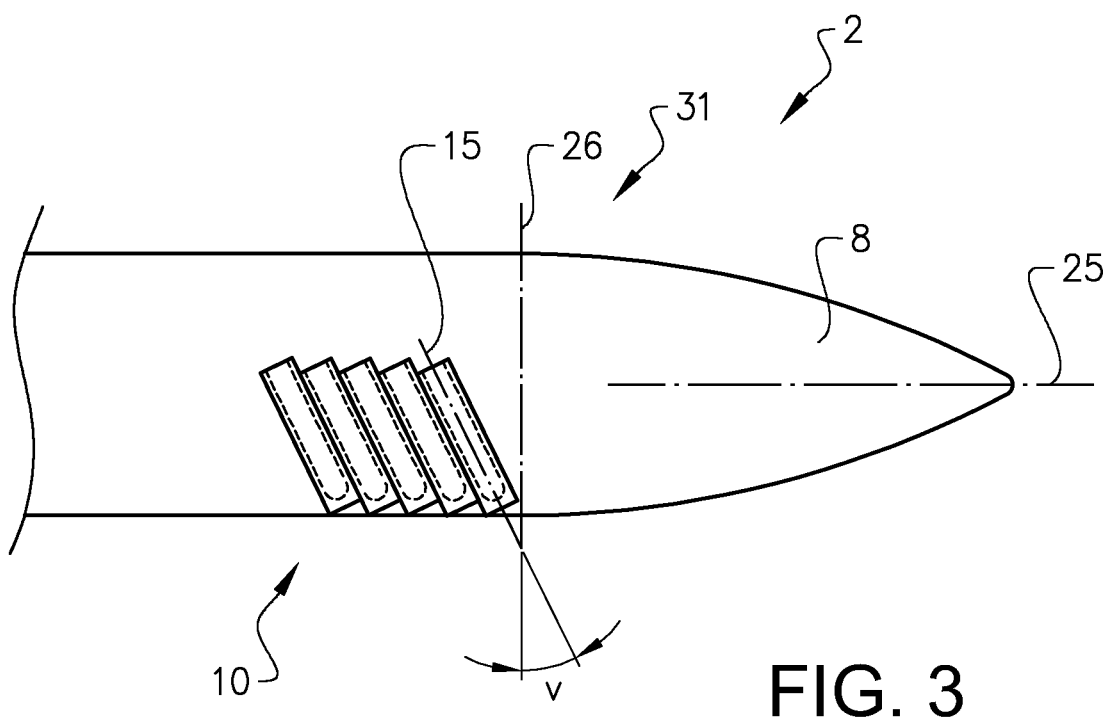

The dispenser 2 is described in more detail with reference to FIG. 2 and FIG. 3. The described dispenser is adapted to be used on an aeroplane and the angles described here are thus adapted for the use on an aeroplane. Other angles are of course also possible. The dispenser 2 is designed as an elongate body 8, partially shown in FIG. 2, provided with at least one launch opening 10 used for storing the countermeasures 5 in a magazine 11 comprising a plurality of cartridges 12. A cartridge 12 comprises a cavity 13, adapted to store the countermeasure 5 and is provided with an opening 14. The countermeasures 5 are connected to a launching control unit (not shown) for feeding launching signals to the countermeasures. The cartridges 12 may be individual cartridges mounted to each other in a replaceable manner to form a magazine such that a cartridge can be replaced when it has been launched. A magazine may also comprise fixed cartridges, where a cavity 13 may be reloaded with a new countermeasure. The cartridges 12 can be of the same size or of different sizes and can accommodate identical or different types of countermeasures 5. FIG. 2 and FIG. 3, schematically shows a magazine comprising five rows of cartridges.

The magazine 11 and cartridges 12 are adapted to be tilted from a resting position 30, shown in FIG. 2, to an active position 31, shown in FIG. 3. Adjacent cartridges 12 are arranged to each other in a slidable manner allowing for the magazine 11 to be tilted by a tilting means in a selected angle relative a horizontal and vertical direction with reference to the direction of motion of the aircraft, such that the openings of the cartridges can be directed in the desired direction.

Here, the directions are defined as follows. The forward direction 25 of the aircraft is defined as the direction of motion of the aircraft. The plane is flying in the horizontal plane, i.e. the wings of the plane are parallel to the horizontal plane. The horizontal plane comprises a forward horizontal direction, i.e. the direction of motion of the aircraft, and a sideway horizontal direction, i.e. perpendicular to the forward horizontal direction. The vertical direction 26 is defined as being perpendicular to the horizontal plane. The normal flight direction of a helicopter is defined in the same way.

In the example shown in FIG. 2, the magazine 11 is in a resting position 30 where the cartridges 12 are directed rearwards by 10 degrees relative the vertical direction 26. This angle is preferably in the range between 0-10 degrees, but depends on e.g. the design of the dispenser and may thus also be in another range. With this inclination angle v, the cartridge openings 14 are directed rearwards in the resting position to eliminate the induced acoustic effect of open barrels. The cartridge openings 14 are in the shown example perpendicular to the centre axis 15, but may also have a different orientation. Should the cartridge openings be positioned at an angle to the centre axis of the cartridge, the cartridges are directed a corresponding angle in the vertical direction to avoid the acoustic effect of open barrels.

In the example shown in FIG. 3, the magazine 11 is in an active position 31 with the cartridges inclined forwards such that a forward launch angle is obtained. The forward inclination angle v is chosen depending on the intended use of a countermeasure and the active position may, e.g. be directing the cartridges between 30-60 degrees in a forward direction. In the active position, the cartridges may also be directed in a sideway direction of e.g. plus and minus 30 degrees. The magazine 11 may also be arranged without an inclination, i.e. directing the cartridges in the vertical direction, or may be arranged in another direction relative to the longitudinal direction of the elongate body. An inclined launch angle may be advantageous when a countermeasure is fired downwards from the dispenser, a straight launch angle may be advantageous when launching a countermeasure in a sideway direction from the aircraft.

Figure 4:
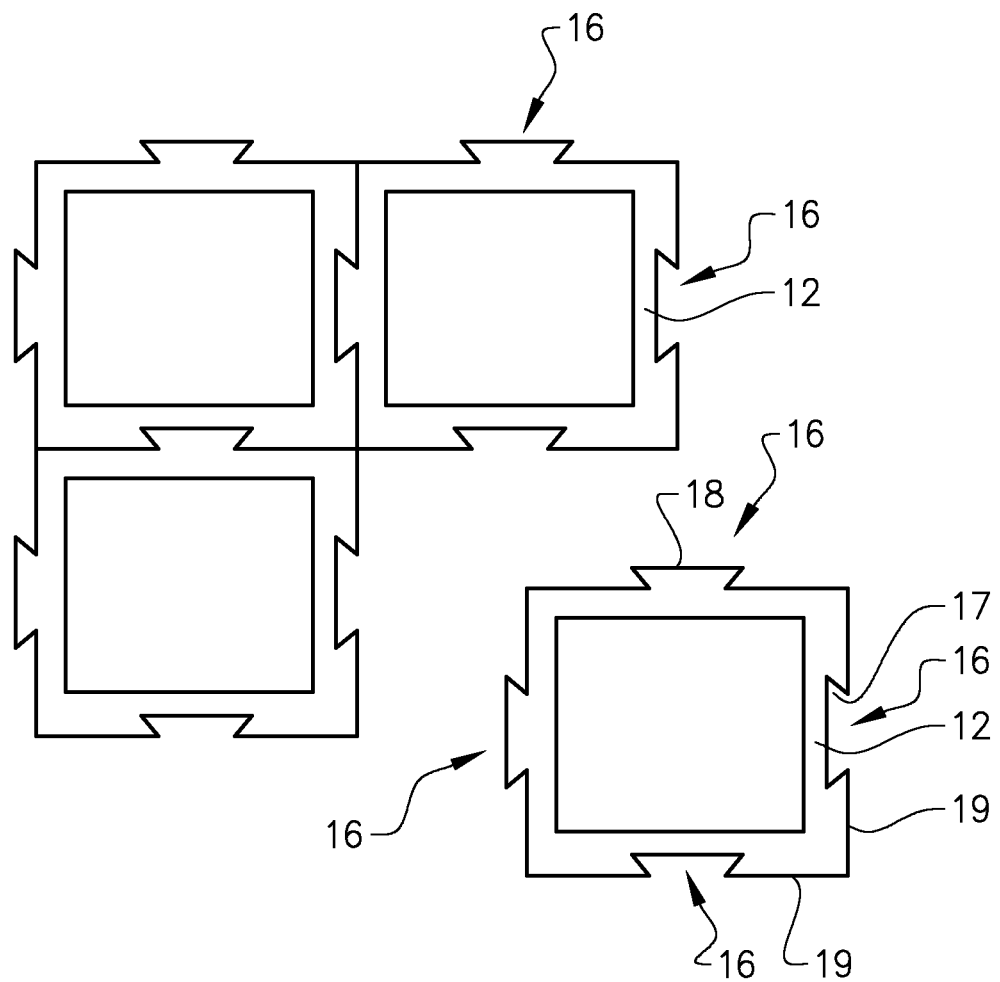

FIG. 4 schematically shows a top view of a part of a magazine according to the invention. In the example shown in FIG. 4, each cartridge 12 comprises longitudinal interconnection means 16 arranged in parallel with the centre axis 15 of the cartridge, where adjacent cartridges 12 are interconnected to each other in a slidable manner by the interconnection means 16. In FIG. 4, the interconnection means 16 comprises longitudinal grooves 17 and tongues 18. Here, the shown grooves and tongues have a dovetail shape, but the grooves may also be T-shaped with a nut interconnecting two adjacent cartridge cases. Other types of grooves are also possible. In this example, the cartridge 12 has a square cross-section and the interconnection means 16 extend on all four longitudinal external sides 19 of a cartridge 12. The cartridge can have a different cross-sectional shape, for example triangular, oval, round or polygonal. Dependent on the cross-sectional shape, the interconnection means extend on at least one external side of each cartridge such that adjacent cartridges can be interconnected.

Figure 5:
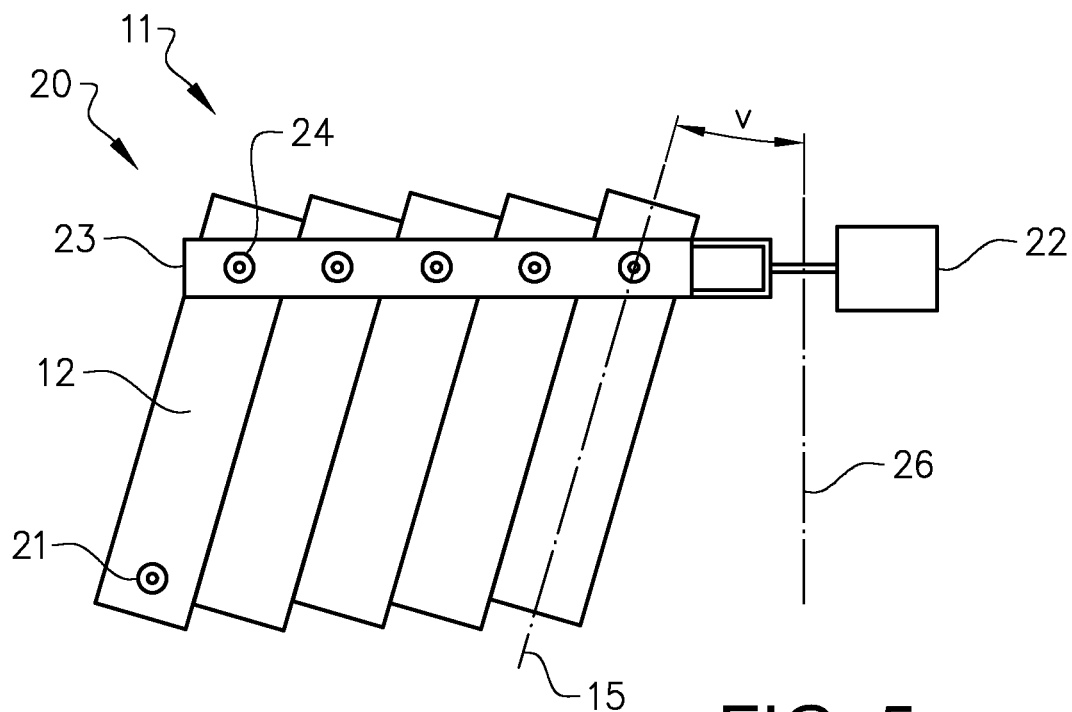
Figure 6:
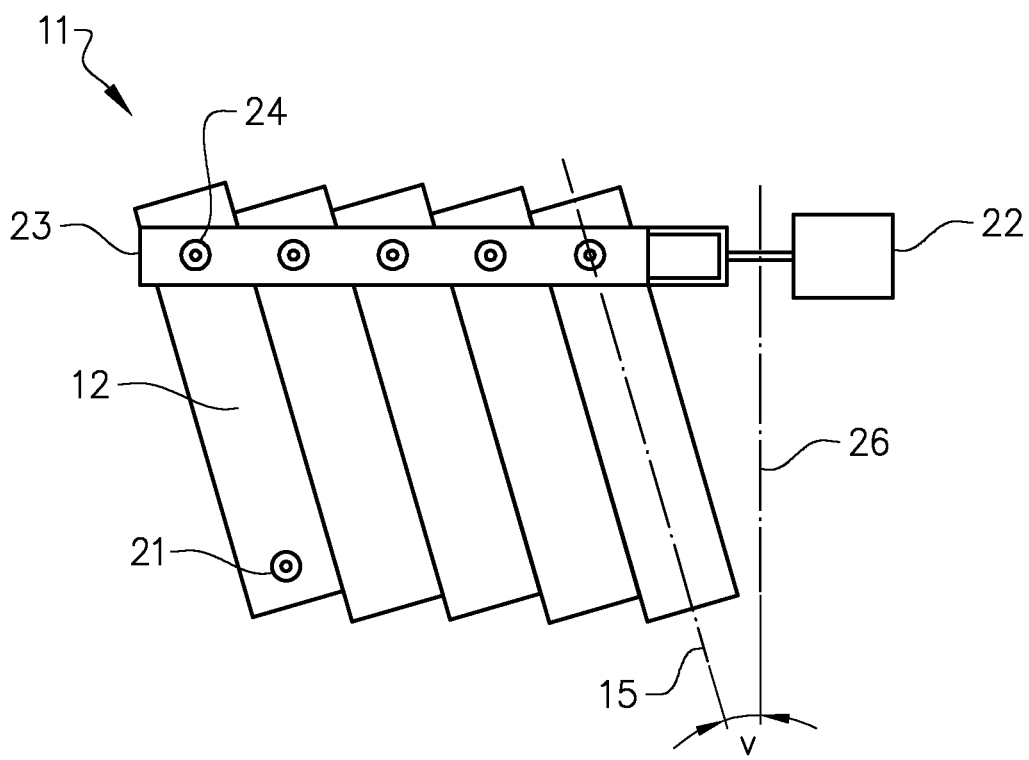

FIG. 5 schematically shows an example of a side view of a magazine in a resting position to be used in a dispenser according to the invention, and FIG. 6 schematically shows a side view of a magazine in an active position to be used in a dispenser according to the invention. The magazine 11 comprises a tilting means 20 adapted to tilt the cartridges of the magazine in a selected direction. The tilting means constitutes in this example a sliding bar 23 attached to the cartridges with sliding bar connections 24. Here, the tilting means 20 comprises one fixed hinge-point 21 attached to the elongate body 8 and to the magazine 11. The hinge-point 21 is attached to the magazine 11 via one cartridge 12, preferably arranged in a corner of the magazine. The tilting means 20 comprises an actuating means 22 arranged to displace the sliding bar in a longitudinal direction, such that the cartridges tilt with respect to the hinge-point 21. The hinge-point may be positioned at any position of the cartridge, e.g. at a position at the bottom, at a position at the opening or at an intermediate position. The sliding bar is attached to the magazine at a position spaced apart from the hinge-point.

The tilting means 20 comprises a sliding bar 23 positioned at a distance from the hinge-point 21. The sliding bar 23 slidably interconnects the cartridges 12 via sliding bar connections 24 attached to the cartridges 12 which allows for tilting of the magazine 11 by the actuating means 22. Other tilting means are also possible, depending on the size and weight of a magazine. The actuating means 22 may be e.g. a motor acting on a toothed rail or a linear electrical cylinder.

The invention is not to be regarded as being limited to the embodiments described above, a number of additional variants and modifications being possible within the scope of the subsequent patent claims. The cartridges may be arranged adjacent each other in different ways and may be tilted with different means.

REFERENCE SIGNS

1: Aircraft
2: Dispenser
3: Direction of launch
4: Trajectory
5: Countermeasure
6: Wing
7: Main body
8: Elongate body
10: Launch opening
11: Magazine
12: Cartridge
13: Cavity
14: Opening
15: Centre axis
16: Interconnecting means
17: Longitudinal groove
18: Tongue
19: Longitudinal external side
20: Tilting means
21: Hinge-point
22: Actuating means
23: Sliding bar
24: Sliding bar connections
25: Forward horizontal direction
26: Vertical direction
30: Resting position
31: Active position

The invention claimed is:

1. A dispenser (2) for storing and launching countermeasures (5), comprising an elongate body (8) provided with at least one launch opening (10) and configured for storing the countermeasures (5) in cartridges (12), wherein:
   the dispenser comprises a plurality of cartridges (12) forming a magazine (11), wherein each cartridge comprises an opening (14) and a center axis (15),
   the dispenser is configured to be mounted on an aircraft (1) with a longitudinal direction of the elongate body (8) essentially coinciding with a direction of motion of the aircraft (1), wherein the cartridges (12) are arranged to each other in a slidable manner in a direction coinciding with the center axis (15), and
   the cartridges (12) of the magazine (11) are configured to be tilted by a tilting means (20) in a selected angle with reference to the direction of motion of the aircraft (1) and dependent on the relative azimuth and elevation angle to an incoming threat, such that the openings (14) of the cartridges (12) are oriented in a selected direction.

2. The dispenser according to claim 1, wherein:
   each of the cartridges (12) comprises longitudinal interconnection means (16) arranged in parallel with the center axis (15), and
   adjacent ones of the cartridges (12) are interconnected to each other in a slidable manner by the interconnection means (16).

3. The dispenser according to claim 2, wherein the interconnection means (16) comprises longitudinal grooves (17) and tongues (18).

4. The dispenser according to claim 3, wherein the interconnection means (16) extend on a plurality of longitudinal external sides (19) of each of the cartridges (12).

5. The dispenser according to claim 1, wherein the cartridges (12) are configured to be tilted from a resting position (30) to an active position (31).

6. The dispenser according to claim 5, wherein the resting position (30) is a position in which the cartridges (12) are directed rearwards between 0-10 degrees relative a vertical direction (26).

7. The dispenser according to claim 6, wherein the active position is a position wherein the cartridges (12) are directed forwards or rearwards between 10-60 degrees relative the vertical direction (26).

8. The dispenser according to claim 7, wherein the cartridges (12), in the active position, can also be tilted in a sideway direction.

9. The dispenser according to claim 1, wherein the dispenser (2) is configured to tilt from a resting position (30) to an active position (31) before a countermeasure is fired and to tilt back to the resting position (30) after a countermeasure is fired.

10. The dispenser according to claim 1, wherein the tilting means (20) comprises one fixed hinge-point (21) attached to the elongate body (8) and the magazine (11).

11. The dispenser according to claim 1, wherein the tilting means (20) comprises a sliding bar (23) positioned at a distance from the hinge-point (21), wherein the sliding bar slidably interconnects the cartridges (12) via sliding bar connections (24) attached to the cartridges (12) which allows for tilting of the magazine (11) by an actuating means (22).

12. A method for launching countermeasures (5) from the dispenser (2) of claim 1 when mounted on an aircraft (1), the method comprising the steps of: tilting the cartridges (12) from a resting position (30) to an active position (31) with reference to the direction of motion of the aircraft (1) and dependent on the relative azimuth and elevation angle to the incoming threat, launching at least one of the countermeasures (5) toward the incoming threat, and following the launching tilting the cartridges (12) back into the resting position (30).

13. The method according to claim 12, wherein the cartridges (12), in the resting position (30), are directed rearwards relative a vertical direction, and wherein the cartridges (12), in the active position (30), are directed in a forward direction relative the vertical direction.

14. The method according to claim 13, wherein the cartridges (12) are also directed sideways in the active position.

* * * * *